United States Patent [19]
Elliott

[11] Patent Number: 5,555,909
[45] Date of Patent: Sep. 17, 1996

[54] CONNECTIONS FOR VALVES

[75] Inventor: Jeff Elliott, West Pennant Hills, Australia

[73] Assignee: Goyen Controls Co. Pty. Limited, Milperra, Australia

[21] Appl. No.: 211,383

[22] PCT Filed: Oct. 1, 1992

[86] PCT No.: PCT/AU92/00532

§ 371 Date: May 27, 1994

§ 102(e) Date: May 27, 1994

[87] PCT Pub. No.: WO93/07411

PCT Pub. Date: Apr. 15, 1993

[30] Foreign Application Priority Data

Oct. 1, 1991 [AU] Australia .................................. PK8667

[51] Int. Cl.$^6$ ...................................................... F16L 5/00
[52] U.S. Cl. ............................................. 137/359; 251/148
[58] Field of Search ......................... 251/148; 137/359 I, 137/360

[56] References Cited

U.S. PATENT DOCUMENTS 3,749,356 7/1973 Conley ..................................... 251/148
5,056,755 10/1991 Jang et al. ............................... 251/148
5,236,229 8/1993 Gonzalez ............................. 137/359 X

FOREIGN PATENT DOCUMENTS 249981 5/1963 Australia .
453291 2/1972 Australia .
438864 6/1967 Switzerland .
1493499 11/1977 United Kingdom .

*Primary Examiner*—Stephen M. Hepperle
*Attorney, Agent, or Firm*—Learman & McCulloch

[57] ABSTRACT

A sealing and joining arrangement (49) suitable for use in conjunction with a valve (28) used for delivering a blast of compressed air from a reservoir (20) to a blow-tube (34) of a dust-collector baghouse (39). The arrangement comprises (i) a socket-to-tube interconnection including one seal (48) to adapt the socket to the tube; and (ii) a second compliant seal (42) to adapt either the socket or tube (as required) to a clearance hole (44) of a bulkhead wall (36) of the baghouse. The socket-to-tube part of the arrangement may be applied to either outlet (preferably), inlet or both. The arrangement (49) may facilitate assembly of many valves in a baghouse typical within the dust collector field.

14 Claims, 7 Drawing Sheets

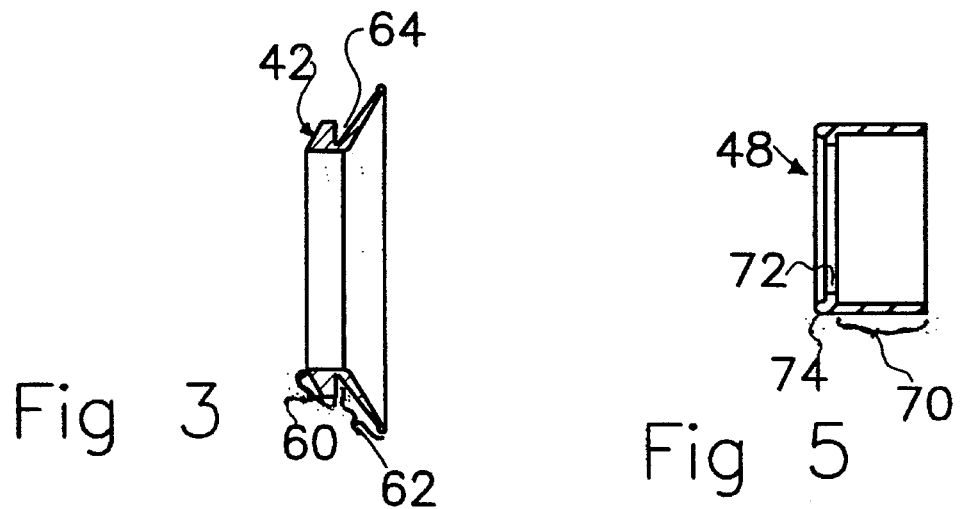
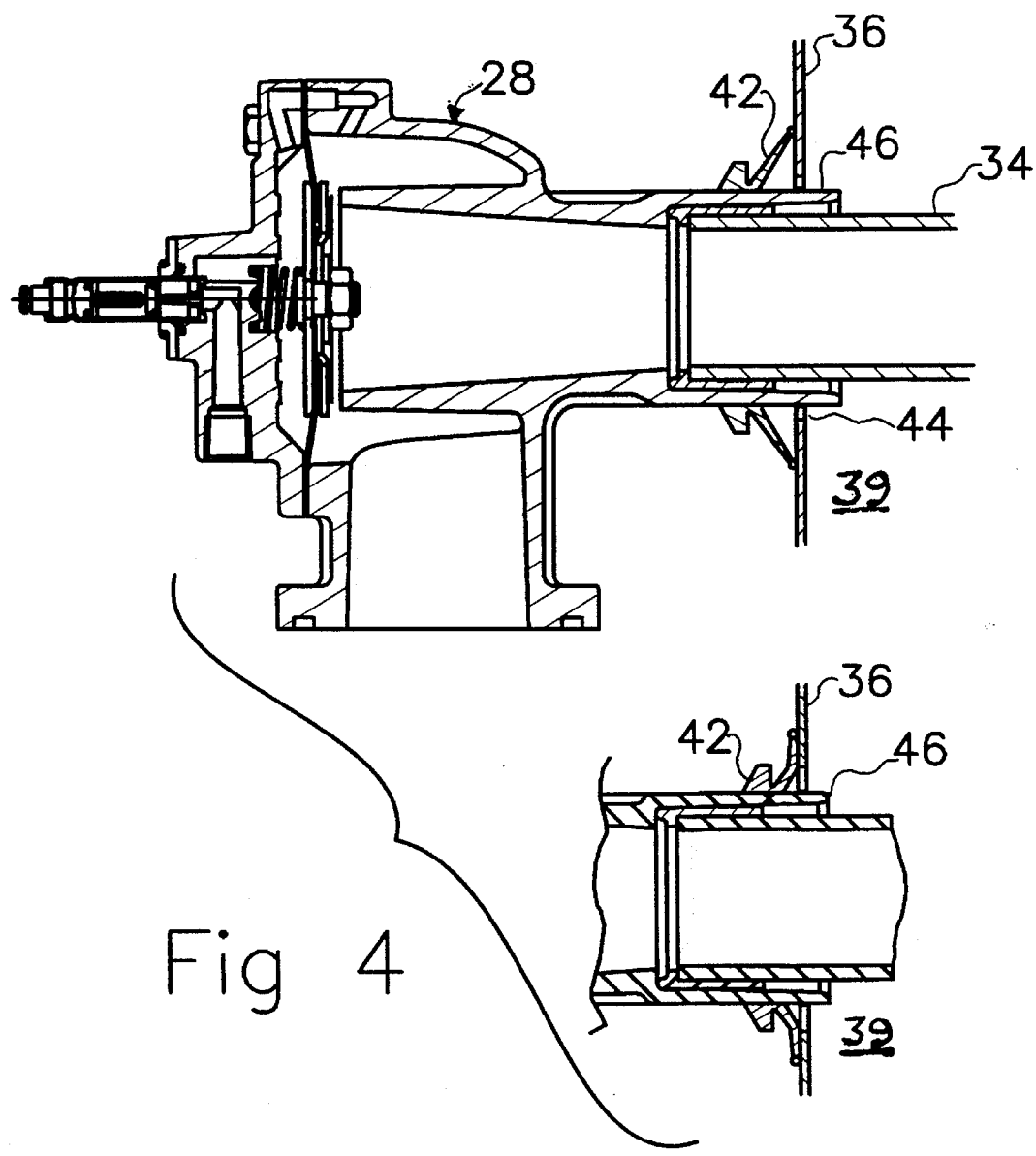

CONNECTIONS FOR VALVES

BACKGROUND

This invention relates to valves, in particular the connection ports of such valves. It more particularly relates to the joining arrangements used to connect such valves to compressed air supply and delivery points. It includes associated resilient moulded sealing members and means of adaptation of the valve ports to the inlet and outlet ducts to which the valve is to be connected.

A particular presently known application relates to right-angle flow path diaphragm valves as used in the reverse flow or reverse jet pulse dust collector valve art. Here, the invention relates to joining or connection arrangements applicable to interposing such valves as require connecting one duct sourcing compressed air to a second duct at right-angles to the first that requires the compressed air to be delivered to it. The applicability of the invention may extend to 180° flow path valves and piston rather than diaphragm types.

The applicability of the invention by way of example to the specialized dust collector art is illustrated in the schematic accompanying illustrations FIG. 10 and 11 and described later in more detail with reference to those Figures.

In the dust collector field, prior connection arrangements have included tapered threaded connections at the valve ports and, at greater expense, compression nut Dresser-type fittings. Problems already experienced with valves having threaded inlets include where, to achieve alignment, under-tightening of the threads allows pressure leakage, whilst over-tightening leads to possible fracture of the valve body. The likelihood of alignment problems of the valves can be appreciated by later reference to FIGS. 10 and 11 although FIG. 10 indicates use of prior art Dresser fittings, as illustrated in FIG. 12. Whilst Dresser fittings allow a greater amount of adjustability and tolerance to manufacturing variables than threaded connections, the amount of available adjustment could be with advantage greater. Also, the fittings are relatively expensive.

An object of the invention is to provide a valve having connection port arrangements having resilient sealing members suitable for enabling more economical simplified joining or connection to ducts the arrangements being capable of ameliorating disadvantages experienced in prior used arrangements.

SUMMARY OF THE INVENTION

In one form, the invention consists of a compressed air pressure tight sealing and joining arrangement for use in conjunction with a valve having an inlet port and an outlet port, the inlet port being connectable by an inlet pipe to a rigid header reservoir containing compressed air and the outlet being connectable to a compressed air delivery duct that passes substantially perpendicularly through a clearance hole in a wall into an enclosed chamber, the combination of a first sealing arrangement enabling sealing of the outlet part of the valve to the delivery duct and comprising socket and tube means and a second sealing means adapted to seal the socket and tube means at the said hole and comprising and annularly shaped pre-moulded axial push-on resilient seal having a skirt portion adapted to deformably bear against the wall surrounding said hole and wherein the skirt portion is tapered and extends both radially and axially outwardly from one end of a cylinder gripping portion adapted to be axially slidable over a pre-determined one of either said socket or tube in order to seal between it and said hole.

In another aspect, the invention consists of a valve including compressed air flow port means comprising at least one said port means terminating in a socket having a tube-to-socket seal comprising an enlongated bore adapted to detachably receive by insertion therein an end portion of a cylindrical duct having which is detachably applied a first seal means adapted to frictionally grip the said end portion during relative axial movement between said pipe and said socket and wherein said first seal further includes a nose portion extending both axially and radially away from said open end, said nose portion having an outwardly curved surface adapted to abut the inside wall of said elongated bore.

In a further aspect, the invention consists of a valve having an outlet port terminating in a socket having an elongate bore, the bore being adapted to receive by insertion therein a cylindrical pipe and wherein a tube-to-socket seal arrangement is provided between said bore and said pipe that includes a moulded resilient seal having an elongate tubular portion overlying one end of the cylindrical pipe and wherein the valve has an inlet port comprising a flange coupling.

BRIEF DESCRIPTION OF THE DRAWINGS

The invention is described with reference to the accompanying illustrations showing a particularly preferred embodiment of the invention by way of example, and variations thereof in which:

FIG. 3 is a cross-sectional view of a bulkhead wall seal forming a part of the invention;

FIG. 4 includes two further views of the joining arrangement showing the behaviour of the bulkhead wall seal of FIG. 3 under axial variation in the position of the joining arrangement relative to the wall;

FIG. 5 is a cross-sectional view of a resilient blow tube-to-socket seal forming a part of the joining arrangement of the invention;

DETAILED DESCRIPTION

Figure 1:
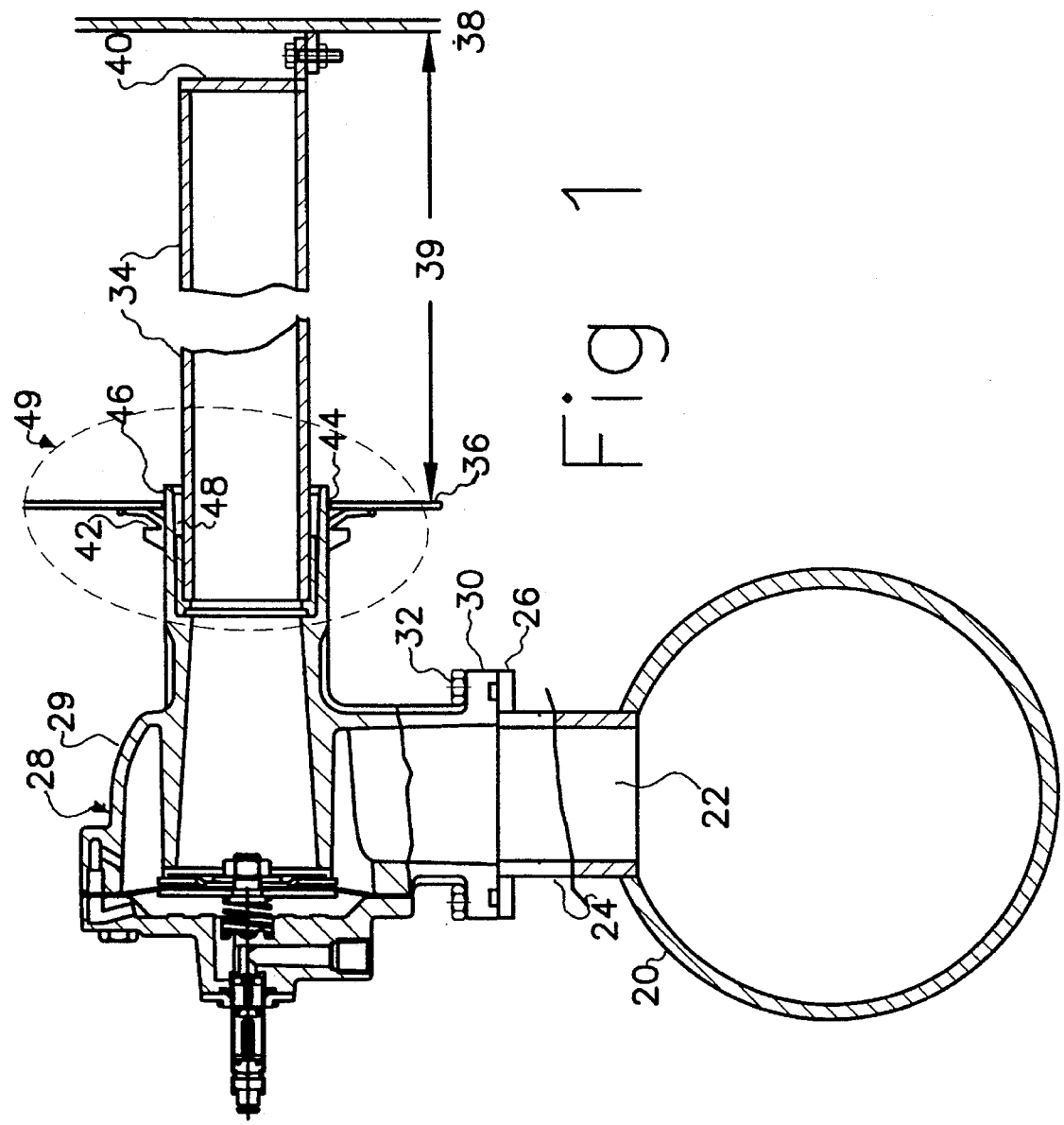
FIG. 1 is a cross-sectional elevation of a compressed air pressure tight joining arrangement according to the invention for use with a right-angle diaphragm valve.

With reference to FIG. 1, a horizontal header pipe (20) is shown having an upwardly facing opening extended by an intersecting vertical short length of smaller diameter pipe referred to hereinafter as the inlet pipe(24), terminating in a conventional flange fitting (26). A right angle style diaphragm type valve (28), having a mating flange fitting (30) at its inlet, is rigidly joined to the inlet flange (26) using any suitable fastening means that may include bolts (32), as illustrated. The valve (28) itself of conventional design in all respects except for the combination of connection ports and seals, in this instance including joining arrangements integrally formed with a body (29) of the valve enabling it to be connected to the inlet pipe (24) and a compressed air outlet duct referred to as a blowtube (34), for further directing the compressed air emitted from the valve outlet into for example, a row of filter elements (not shown FIG. 1 but see FIG. 11) contained within the vertical bulkhead walls (35, 38), a clearance hole (44) of a baghouse (39) dust filtering installation. The or each blowtube (34) passes through a clearance hole (44) in one vertical bulkhead wall (36) of the baghouse at right angles and requiring sealing against air leakage at the clearance hole. The blowtube (34) is closed at its end (40) distant from where it is joined to the valve outlet. The invention in part comprises, insofar as the FIG. 1 embodiment of it illustrates, a baghouse to socket moulded seal (42) that seals between the clearance hole (44) and the outside diameter of socket (45) and also comprises the socket to blowtube seal (48) between the open end of the blowtube and the bore of the socket, described in more detail with reference to FIGS. 5, 6, and 7. The seals (42, 48) and joining arrangement as a whole (49) provide in combination particular advantages and convenience in fabricating and assembling the baghouse, by being tolerant of either unintended out of position inaccuracies associated with assembly errors or inevitable relative movement between either or both the bulkhead walls (36, 38) and the header pipe (20), socket (46) and blowtube (34) when in use.

Figure 2:
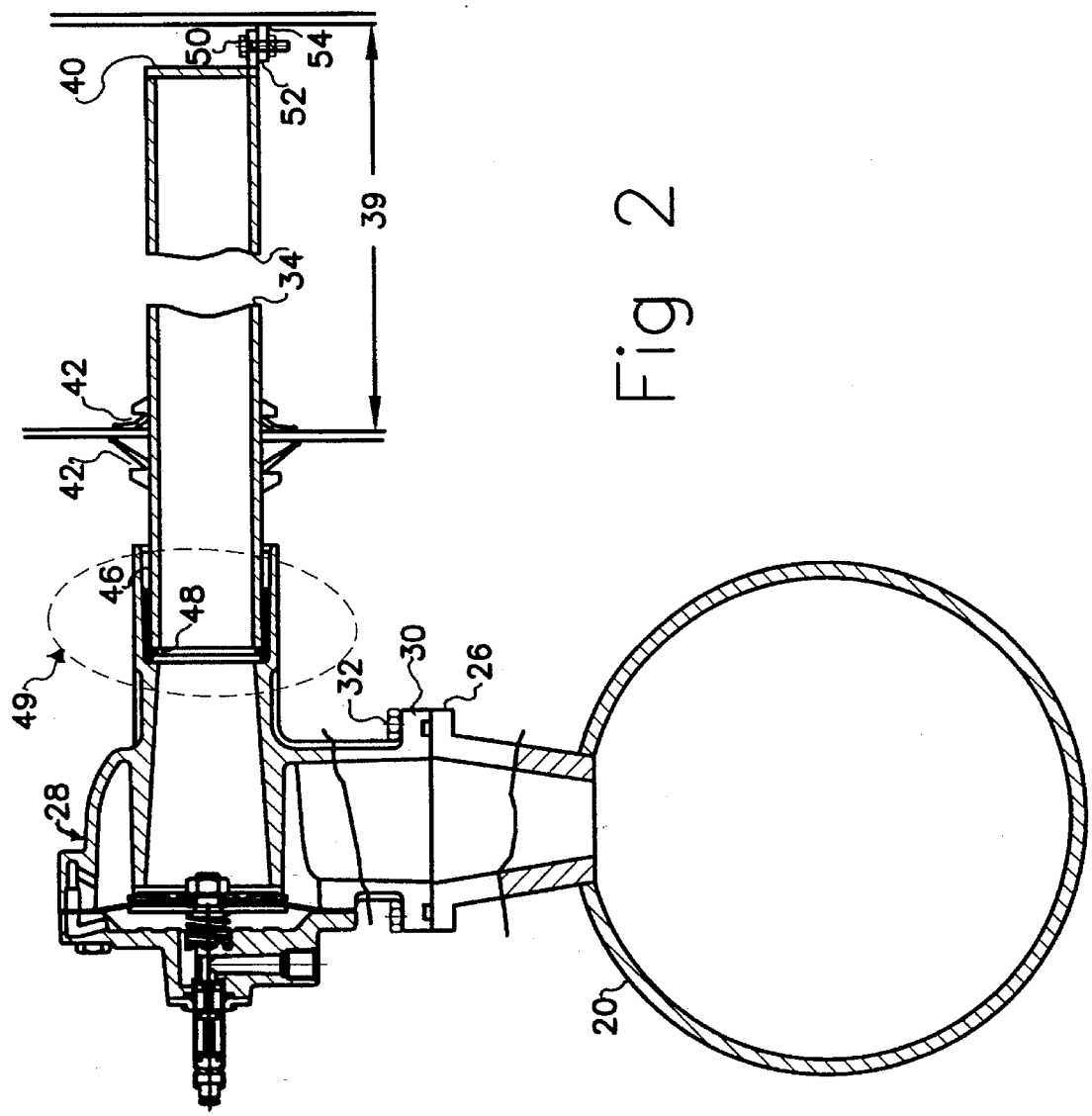
FIG. 2 is an elevation generally similar to FIG. 1 showing an alternative embodiment of the joining arrangement.

With reference to FIG. 2, a variation of the arrangement as shown in FIG. 1 is depicted. In this case the clearance hole (44) in the baghouse wall (36) may be smaller than shown in FIG. 1 with the intention that clearance between the blowtube (34) and the hold (44) may be generally similar to that between the socket (46) and hole (44) or FIG. 1. However, if a larger clearance hole (44) were used, a suitably larger seal (42) could be chosen to accommodate the larger hole. The blowtube (34) passes through the hole (44) and extends far enough beyond the wall, outside the baghouse, to enable the socket to tube assembly (49) to lie completely outside of the baghouse. In this case the baghouse to blowtube seal (42) may be moulded to an inside diameter to tightly fit the blowtube although, alternatively, a cylindrical adaptor bush (not illustrated) could be provided to enable one size of seal (42) to serve either the FIG. 1 or FIG. 2 option. In both FIGS. 1 and 2 the blowtube (34) is shown as being mechanically connected to the baghouse wall (38) by means of a fastener which suitably may be a threaded fastener (50) such as a bolt and nut entered through a mating hole in each of two brackets, one (52) at the closed end of the blow tube, the associated one (54) fixed to the baghouse wall. In both FIGS. 1 and 2 the bolted mating flange connection (26, 30, 32) of the inlet of the valve to the inlet pipe is shown being preferred since it enables the valve (28) to be connected by sliding it horizontally to mate up with the blowtube (34) and, upon correctly positioning the flange (26, 30), the bolts (32) to be inserted and tightened. This assumes completion of the preceding assembly steps in the order baghouse, header, blowtube. It is not intended that the illustrated mating flanges in FIG. 1 and 2 be the only form of connection, within the scope of the invention, possible at the inlet. A tube and socket connection, essentially similar to or the same as that (49) shown at the outlet, may be employed if desired. In that case, it may require the completion of the assembly steps to proceed such that the valve (28) is firstly moved vertically downward onto the inlet pipe (24) then the mouth of the blowtube (34) is inserted in the socket (46) by sliding the blowtube out through the clearance hole (44) into the socket then fastening the blow tube (34) at its closed end (40) to the wall (38).

As shown in FIG. 2, there may be two bulkhead seals (42) used, one abutting the outer face of the bulkhead (36) and one abutting the inner face. Such an arrangement would be possible also in the FIG. 1 embodiment and if used in either case may improve. If necessary, the standard of tightness of the sealing at the clearance hole (44), particularly if the clearance were larger than the illustrations indicate.

FIG. 3 shows the as moulded bulkhead seal (42) illustrated in FIGS. 1 and 2, to a larger scale. The seal comprises an annular gripping band (60) at one end and a radially outwardly and axially extending tapering skirt (62) at the other end, the two portions being separated by a thin walled flexure portion (54) at the centre. The seal (42) is moulded in an elastomeric material which may be nitrile or other rubber, polyurethane elastomer or other elastomeric material that displays a suitable degree of resiliency.

With reference to FIG. 4, the two views each show the ability of the bulkhead seal (42) to maintain a seal against the bulkhead (36) irrespective of relatively significant movement of the bulkhead axially with respect to the socket (46). Such movement can occur as a result of inevitable differential pressure fluctuation between the inside and outside of the baghouse (39) causing relative inward and outward movement of both walls (36, 38) in relation to the position of the socket (46) and valve (28). It can also be useful in taking up minor variations caused by inaccuracies in the fabricated parts that together form the completed baghouse filter installation. This is useful in reducing the costs of high precision fabrication and assembly by providing an error tolerant joining means. The arrangement described in connection with the preceding and subsequent figures enables compensation to be made for differences in the position of each clearance hole (44) relative to the header (20), such compensation being necessary because of the tolerances worked to and economical in the context of the method of manufacture usual in dust collector filter baghouse fabrication (that is, they are substantially large sheet or plate metal structures constructed without machining). There may be considerable deviation from straightness and flatness caused by the forming processes to manufacture the header tube and the sheets or plates used for the baghouse. A valve incorporating the joining arrangements according to the invention can compensate for considerable lack of flatness in the bulkhead wall through which the blowtube or socket (as the case may be) passes.

Figure 6:
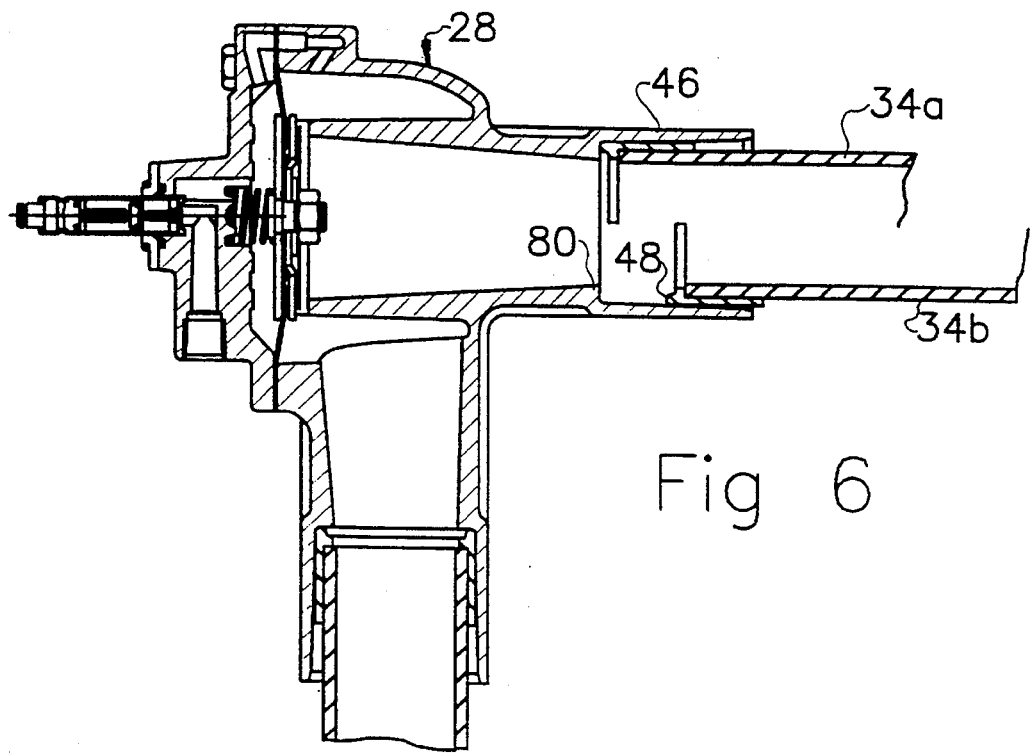
FIG. 6 is a further view of part of the blow tube-to-socket seal included in the invention showing the ability to compensate for axial variations in assembly or during use.

FIG. 5 shows a socket to blowtube seal (48) moulded in a suitably resilient elastomeric material which may be nitrile rubber, for example, comprising an elongated tubular portion (70) adapted to be a slidable although tight fit over the outside diameter of the open end of the blow tube (34, FIG. 4). The bore of the seal (48) is moulded accurately in relation to the outside diameter of the size of the blowtube which it is to fit such that upon engagement with the tube it retains a tight frictional grip during assembly, adjustment or movement in use of the blowtube in relation to the socket. At one end of the elongated tubular portion (70) is an inwardly turned step (72) adapted to abut the tube wall at the open end of the blowtube. This inwardly turned step blends with a rounded cross-section nose portion (74) extending outwardly in both the axial and radial directions such that the maximum diameter of the nose portion is somewhat larger than the inside diameter of the socket in which it is intended to fit. This nose portion (74) being flexible, upon insertion into its mating socket can maintain a seal along an axial length of a tapered bore of the socket by virtue of the nose portion (74) flexing inwardly to less than its unconstrained diameter. The nose portion can readily deform inwardly or outwardly to maintain pressure tightness. The nose portion (74) upon assembly may abut a step or shoulder (80 FIG. 6) formed in the socket (46). FIG. 6 illustrates the ability of the blowtube-to-socket seal (48) to maintain its sealing contact regardless of substantial axial displacement of the blowtube (34) in relation to a taper in the bore of the socket, as illustrated by the two half sections (34a, 34b) of the blowtube as schematically shown. For ease of manufacture of the socket (45), including when the outlet of the valve (28) is constructed as an integral part of the casting or moulding that comprises a body portion of the valve, the outlet of the socket is preferably somewhat tapered. Despite any such taper the resilient socket to blow tube seal (48) is capable of conforming over a range of axial positions as illustrated. This again facilitates the more economical fabrication and assembly of baghouse filters.

Figure 7:
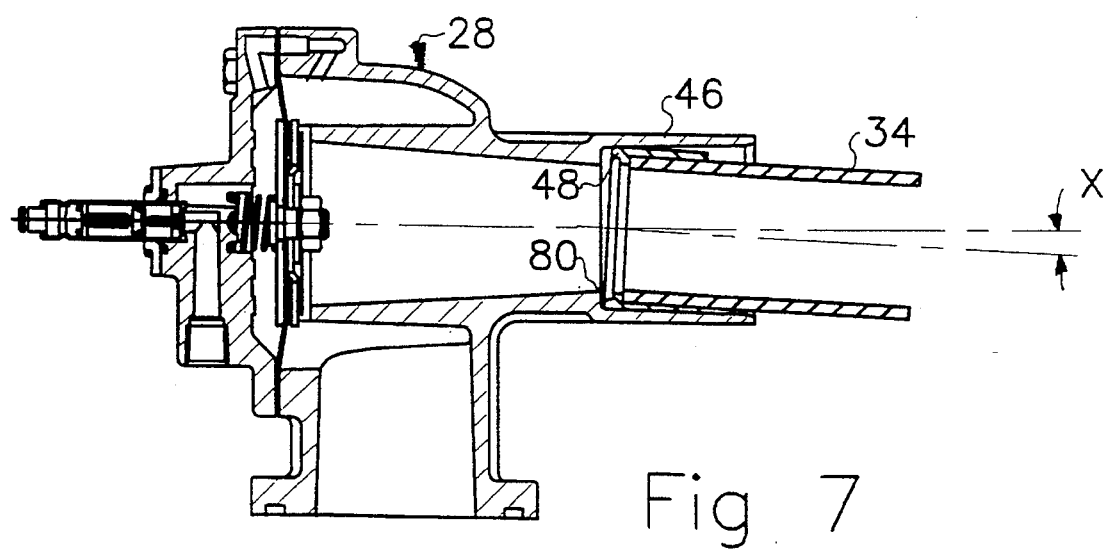
FIG. 7 is a similar view to FIG. 6 showing similarly a tolerance to angular misalignment.

Referring to FIG. 7, the socket-to-blowtube seal (48) can be seen to be tolerant also to angular misalignment (x), again a very useful feature in facilitating the assembly of the valve between the header (20) and the blowtube (34) where the positioning of component parts and features is not precise. The angle (x) may be about 3°.

Figure 8:
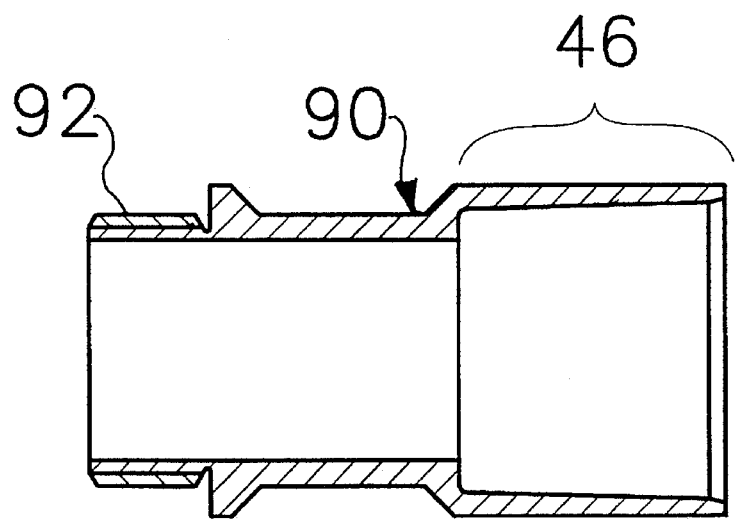
FIG. 8 is a threaded end to socket adaptor being an alternative embodiment of part of the invention as shown in FIGS. 1, 2, 6 and 7.

FIG. 8 shows an embodiment of one aspect of the invention, namely an adaptor piece (90) able to be used by inclusion of one end having a male thread (92) to convert a prior art valve having a conventional female threaded outlet connection to be used in a joining arrangement according to the present invention. In this case the socket portion (46) is similar to that illustrated in FIGS. 1 and 2 and upon joining of the adaptor to the outlet threaded valve port, all other previously illustrated features apply or can be adopted. Such an adaptor piece (90) can be screwed into a female port at the inlet of the valve as well as or instead of the outlet port and so the joining arrangement of the invention can be applied at both or either of the inlet and outlet of a valve according to the invention.

Figure 9:
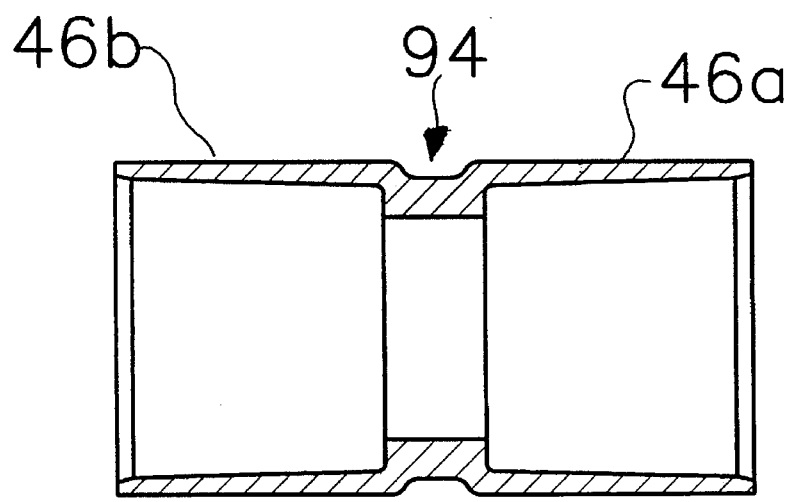
FIG. 9 is a socket to socket adaptor being an alternative embodiment to part of the invention as shown in FIGS. 1 to 8.

FIG. 9 shows an embodiment of one further aspect of the invention, namely an adaptor (94) usable in or for a valve either made integrally or adapted to have a plain tube shape at either or both the inlet and outlet (not illustrated) to couple to respectively an inlet pipe or a blowtube, as may be preferred for some installations. The adaptor (94) has a socket (46a, 46b) at each end.

Figure 10:
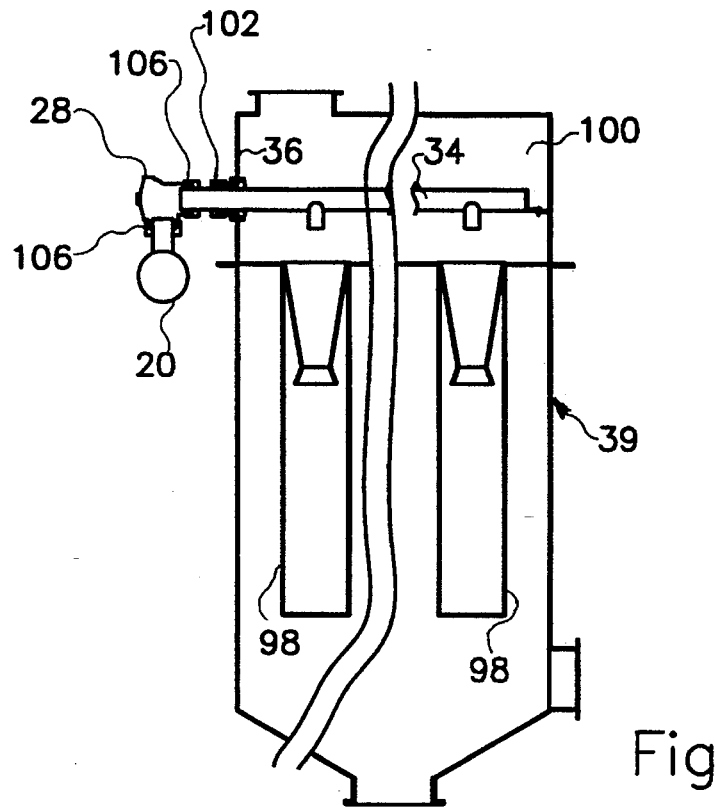
FIG. 10 illustrates somewhat schematically a sectional elevation of a prior art baghouse filter apparatus to indicate a scope of possible use of the invention.

FIG. 10 provides an overall perspective of the scope of the application of the joining arrangement of the invention in the exemplary application to the fabrication of a baghouse containing an array of dust collector filters bags (98). In the illustration, the blowtube (34) is shown connected in one known manner, involving Dresser fittings (102), entering through the wall (36) of a top plenum (100) forming part of the baghouse (39), the joining arrangement to the valve ports also involving Dresser fittings (106), shown in outline.

Figure 11:
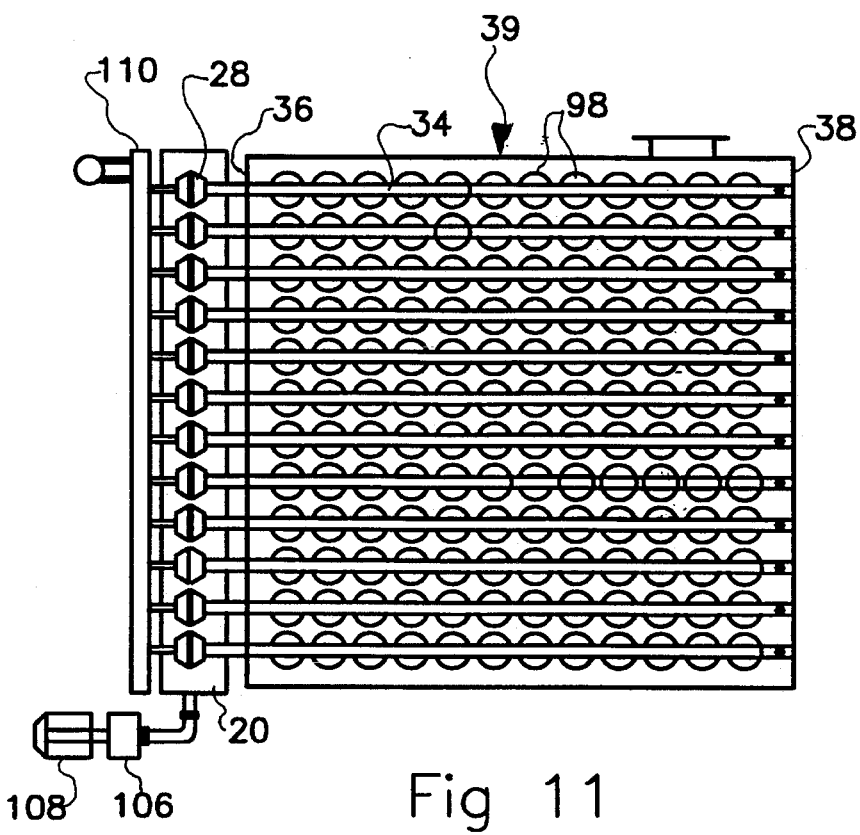
FIG. 11 shows schematically in plan view a baghouse filter apparatus to indicate how the joining arrangement of the invention would be applied in such a context.

FIG. 11 shows schematically a plan view to a much reduced scale of a typical dust filter collector baghouse (39) having aligned filter elements (98) in rows, each row served by one blowtube (34) and valve (28), the view being to indicate the typical substantial size of the arrangement that may typically be 3 meters in length, width and height. The illustration can provide an appreciation of the typical benefit to be gained by the joining arrangement of the invention insofar as it provides a tolerant assembly likely to be capable of reducing the need for difficult to achieve assembly tolerances in a structure of that scale. It is to be noted that the wall thickness of the bulkhead walls (36, 38) of the baghouse (39) are typically relatively thin at 3.5 to 6.4 mm (⅛ to ¼ inch) and so, out-of-flatness variations are likely to be a problem confronting fabricators of such assemblies. Likewise in the header pipe (20), which is in a typical case 150 to 200 mm (6 to 8 inches) diameter, lack of straightness may also create a problem. The joining arrangement of the invention will be greatly of assistance in coping with such variations. Also, since the function of the right angled pneumatic valves (28) is to inject pulses of air sequentially into the suspended vertical rows of filter elements (98) contained in the baghouse (39), in order to dislodge built-up dust off the outside of the elements, the walls (36, 38) of the baghouse (39) tend to flex in and out under the influence of each compressed air pressure pulse. The axial resiliency of the bulkhead seals of the invention (see e.g. FIG. 4) is therefore very useful in continuing to provide a seal in the face of this in-service flexing.

The popularity of right angle flowpath diaphragm valves (28) is explained by the convenience of enabling the header (20) to be accurately located relative to one adjacent wall (36) of the baghouse (39) by relatively small brackets (not shown). By contrast, diaphragm valves with the inlet and outlet ports 180° apart would require a more cumbersome less compact arrangement of the header with respect to the adjacent baghouse wall or, otherwise, would require additional elbow fittings in association with a less convenient offsetting of the position of the inlet pipes in relation to the position of the blowtubes and their wall clearance holes. Other components depicted in FIG. 11 are an air compressor (106), a motor (108) and electrical control duct (110) from which controlling signals to the valves are provided.

With reference to FIG. 12, prior art joining arrangements are shown incorporating Dresser type compression nut fittings. The disadvantages of the prior art types of arrangement have been discussed in the introductory portion of this specification.

Figure 12A:
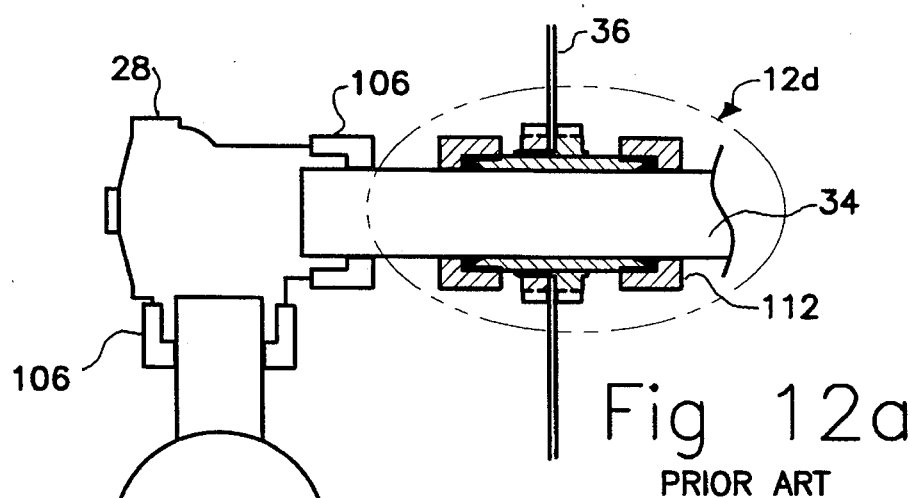
FIG. 12a to d shows views of prior art connection means that could be advantageously replaced by the joining arrangement of the invention.
Figure 12B:
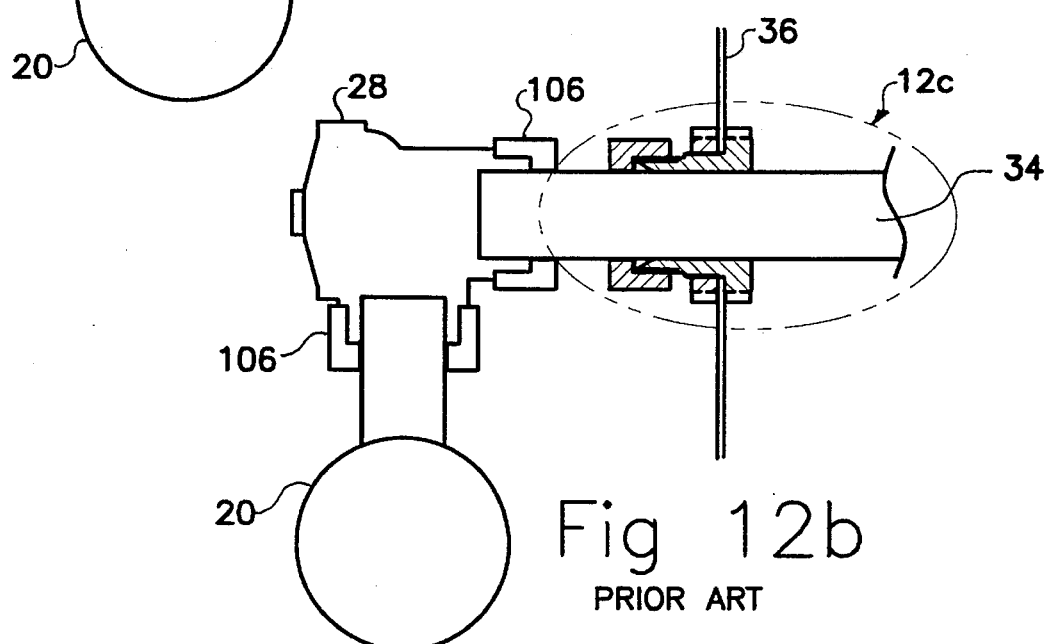
Figure 12C:
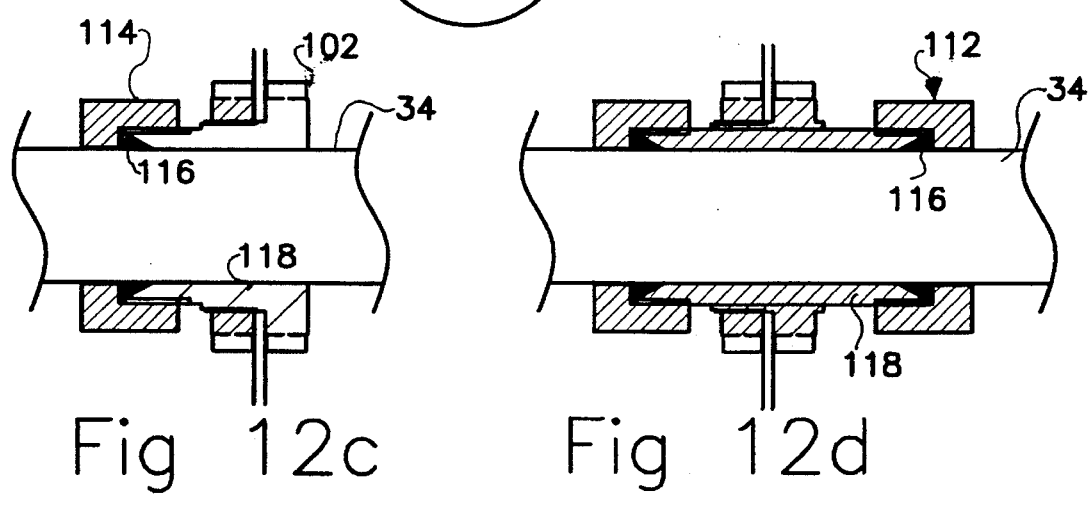
Figure 12D:
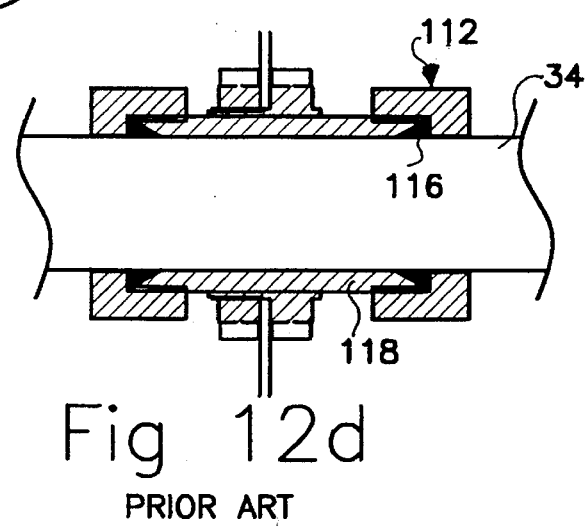

Reference numerals in FIG. 12 follow earlier Figures FIG. 12a and 12d illustrate a double sided Dresser fitting (112). With reference to FIGS. 12c and 12d. It may be noted that the threaded nuts (114) when tightened, tend to force tapered rubber washers (116) into a mating groove in the body (118) of the respective fitting (102, 112) so sealing the fitting to the tube (34). FIGS. 12b and 12c illustrate a single sided Dresser fitting (102).

I claim:

1. A compressed air pressure tight sealing and joining arrangement for use in conjunction with a valve having an inlet port and an outlet port, the inlet port being connectable by an inlet pipe to a rigid header reservoir containing compressed air and the outlet being connectable to a compressed air delivery duct that passes through a clearance hole in a wall into an enclosed chamber, the delivery duct being arranged substantially perpendicular to the wall, the combination of a first sealing arrangement enabling sealing of the outlet port of the valve to the delivery duct and comprising a socket and the delivery duct and a second sealing means adapted to seal the socket and the delivery duct at the said hole and comprising an annularly shaped resilient seal having a skirt portion adapted to deformably bear against the wall surrounding said hole and wherein the skirt portion is tapered and extends both radially and axially outwardly from one end of a cylinder gripping portion adapted to be axially slidable over a predetermined one of either said socket or said delivery duct in order to seal between it and said hole.

2. A sealing and joining arrangement as claimed in claim 1 wherein said valve is a right-angle flow path diaphragm valve.

3. A sealing and joining arrangement as claimed in claim 1 in which the clearance hole is of a pre-determined size to provide clearance to either the delivery duct or the socket.

4. A sealing and joining arrangement as claimed in claim 1 in which the first sealing arrangement is provided at the inlet of the valve.

5. A sealing and joining arrangement as claimed in claim 1 in which the connection at the inlet is selected from the group consisting of a threaded connection and a flanged and bolted connection.

6. A sealing and joining arrangement as claimed in claim 1 when used for sealing between said valve and a blow tube and said clearance hole in a wall of a dust collector baghouse.

7. A sealing and joining arrangement as claimed in claim 1 in which said valve has an outlet port terminating in said socket, said socket comprising an elongated bore adapted separably to receive by insertion therein an inlet end portion of said delivery duct to which is applied a seal which is adapted frictionally to grip said inlet end portion during relative axial movement between said delivery duct and said socket and wherein said seal is formed of a resilient substance having a nose portion extending both axially and radially away from said inlet end, said nose portion having an outwardly curved surface adapted to abut a portion of the inside wall of said elongated bore.

8. A sealing and joining arrangement as claimed in claim 7 in which said valve has at least one port embodying said first sealing arrangement including a cylindrical socket able to receive by insertion therein a cylindrical pipe wherein said resilient moulded seal comprises an elongate tubular portion overlying one end of the cylindrical pipe, providing a tight frictional grip between said tubular portion and said pipe and further comprising a rounded cross-section nose portion that extends outwardly in both axial and radial directions, a maximum diameter of said nose portion being, in an unconstrained state before insertion in said cylindrical socket, larger than that of said elongated bore of said socket.

9. A sealing and joining arrangement as claimed in claim 8 wherein said valve has an inlet port comprising a flanged and bolted connection.

10. A sealing and joining arrangement as claimed in claim 9 wherein said valve has an outlet port comprising an elongate socket having a smoothly finished outside cylindrical surface adapted to receive by sliding thereon a separable socket-to-wall seal having a skirt portion adapted deformably to bear against a wall and wherein said skirt portion is tapered and extends both radially and axially outwardly from one end of a socket gripping portion of said seal, said seal being slidable over said smooth outside surface of said socket to provide an adjustable sealing position in conjunction with the positioning of said socket through a clearance hole in said wall said wall being substantially perpendicular to a cylindrical axis of said socket.

11. A sealing and joining arrangement as claimed in claim 1 in which said valve has a screw threaded outlet port and said socket is a separable adaptor provided at a first end with screw thread means attachable to said outlet port and at a second end with said first sealing arrangement.

12. An annular seal for providing a seal between a pipe and another member, said seal comprising an annular pipe gripping portion of such size throughout its length as snugly to engage said pipe, and a resilient, deformable extension joined to said gripping portion at one end thereof, said extension in its undeformed condition projecting axially and radially beyond said one end of said gripping portion a distance sufficient to engage said another member and be deformed by such engagement, said extension comprising a skirt having a peripheral edge remote from said one end of said gripping portion, said skirt tapering toward said peripheral edge.

13. The seal according to claim 12 wherein said extension comprises a uniformly rounded nose.

14. The extension according to claim 12 wherein at the juncture of said gripping portion and said skirt said gripping portion is of reduced thickness.

* * * * *

UNITED STATES PATENT AND TRADEMARK OFFICE
CERTIFICATE OF CORRECTION

PATENT NO. : 5,555,909
DATED : September 17, 1996
INVENTOR(S) : Jeff Elliott

It is certified that error appears in the above-indentified patent and that said Letters Patent is hereby corrected as shown below:

Column 1, line 60, change "part" to -- port --.

Column 2, line 9, after "having" insert -- an open end on --.

Column 3, line 10, after "itself" insert -- is --; line 44, change "or" to -- of --.

Column 6, line 49, after 12d insert a comma; change "It" to -- it --.

Signed and Sealed this

Fourth Day of March, 1997

Attest:

BRUCE LEHMAN

*Attesting Officer*  *Commissioner of Patents and Trademarks*